United States Patent
Smith (10) Patent No.: US 11,702,990 B2
(45) Date of Patent: Jul. 18, 2023

(54) REDUNDANT ELECTRICALLY DRIVEN FUEL AND OIL PUMPING SYSTEM FOR GAS TURBINE WITH BIDIRECTIONAL PUMP MOTOR

(71) Applicant: Rolls-Royce North American Technologies Inc., Indianapolis, IN (US)

(72) Inventor: Alan W. Smith, Greenwood, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 37 days.

(21) Appl. No.: 17/469,846

(22) Filed: Sep. 8, 2021

(65) Prior Publication Data

US 2023/0070280 A1    Mar. 9, 2023

(51) Int. Cl.
    *F02C 7/236*    (2006.01)
(52) U.S. Cl.
    CPC .......... *F02C 7/236* (2013.01); *F05D 2220/32* (2013.01)
(58) Field of Classification Search
    CPC .............................. F02C 7/236; F05D 2220/32
    See application file for complete search history.

(56) References Cited

U.S. PATENT DOCUMENTS

| | | |
|---|---|---|
| 4,729,218 A | 3/1988 | Haselbauer et al. |
| 5,118,258 A * | 6/1992 | Martin .................... F02C 7/236 60/734 |
| 5,555,722 A | 9/1996 | Mehr et al. |
| 6,914,344 B2 | 7/2005 | Franchet et al. |
| 7,401,461 B2 | 7/2008 | Eick et al. |
| 7,495,354 B2 | 2/2009 | Hermann |
| 8,484,977 B2 | 7/2013 | Bader et al. |
| 8,745,990 B2 | 6/2014 | Burkholder et al. |
| 9,341,117 B2 | 5/2016 | Remer et al. |
| 9,546,599 B2 | 1/2017 | Lindeman et al. |
| 9,688,414 B2 | 6/2017 | Burns et al. |
| 9,729,096 B2 | 8/2017 | Edwards |
| 9,840,969 B2 | 12/2017 | Sheridan |
| 10,125,692 B2 | 11/2018 | Ernst |
| 10,669,943 B2 | 6/2020 | Weir |
| 10,669,950 B2 * | 6/2020 | Dooley ...................... F02C 7/22 |
| 2015/0315980 A1 * | 11/2015 | Edwards ................... F02C 9/30 60/740 |
| 2016/0319745 A1 | 1/2016 | Zeller |
| 2016/0109133 A1 * | 4/2016 | Edwards ................. F04D 13/06 60/746 |
| 2016/0138473 A1 | 5/2016 | Veillux, Jr. et al. |
| 2017/0218855 A1 | 8/2017 | Dooley |
| 2017/0284351 A1 * | 10/2017 | Incerpi .................... F01D 25/20 |
| 2018/0283281 A1 * | 10/2018 | Veilleux, Jr. .............. F02C 7/36 |

(Continued)

FOREIGN PATENT DOCUMENTS

EP    3382183 B1    5/2020

*Primary Examiner* — J. Todd Newton
(74) *Attorney, Agent, or Firm* — Barnes & Thornburg LLP (57) ABSTRACT

A redundant oil and fuel pumping system for use with a gas turbine engine. The pumping system includes a plurality of power sources, a fuel system and an oil system. The fuel system pump being driven by electric motors controlled via variable frequency drives powered by the plurality of power sources. The oil system pump being driven by electric motors controlled via variable frequency drives powered by the plurality of power sources.

20 Claims, 6 Drawing Sheets

(56) References Cited

U.S. PATENT DOCUMENTS

| | | |
|---|---|---|
| 2019/0010874 A1 | 1/2019 | Perkinson et al. |
| 2019/0292937 A1 | 9/2019 | Mason |
| 2020/0216186 A1 | 7/2020 | Zywot et al. |
| 2020/0284164 A1 | 9/2020 | Gebhard et al. |
| 2020/0284195 A1 | 9/2020 | Gebhard et al. |
| 2020/0300168 A1 | 9/2020 | Herring |
| 2020/0362728 A1 | 11/2020 | Davies |
| 2021/0062719 A1 | 3/2021 | Erickson et al. |

* cited by examiner

REDUNDANT ELECTRICALLY DRIVEN FUEL AND OIL PUMPING SYSTEM FOR GAS TURBINE WITH BIDIRECTIONAL PUMP MOTOR

FIELD OF THE DISCLOSURE

The present disclosure relates generally to gas turbine engines, and more specifically to electrically driven fuel and oil pumping system adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines may be powered by a fuel source that is combusted during operation of the gas turbine engine. The fuel source may be stored in a tank and pumped from the tank to the combustor of the gas turbine engine. Gas turbine engines may use lubricant in areas with rotating components to cool the components and reduce friction produced during the operation of the gas turbine engine. The lubricant may collect in one or more sumps and can be recirculated back to the areas of the gas turbine engine using oil pumps. Fuel and oil pumping systems that are electrically driven remains an area of interest in the field of gas turbine engines.

SUMMARY

The present disclosure may comprise one or more of the following features and combinations thereof.

A pumping system for use with a gas turbine engine includes a plurality of power sources, a fuel system configured for redundant operation, an oil system configure for redundant operation, and a bidirectional pump motor. The fuel system includes a fuel pump motor, a first fuel pump, and a second fuel pump. The fuel pump motor being mechanically is connected with the first fuel pump to drive the first fuel pump. The fuel pump motor is electrically connected to the plurality of plurality of power sources. The oil system includes an oil pump motor and an oil pump. The oil pump motor is mechanically connected with the oil pump to drive the oil pump. The oil fuel pump motor is electrically connected to the plurality of plurality of power sources. The bidirectional pump motor is electrically connected to the plurality of plurality of power sources. The bidirectional pump motor is mechanically connected to the second fuel pump and the oil pump such that the bidirectional pump motor is configured to drive either the second fuel pump or the oil pump.

A pumping system for use with a gas turbine engine, includes a plurality of power sources; a first pump motor, a first pump, and a second pump. The first pump motor is mechanically connected with the first pump to drive the first pump. The first pump motor being electrically connected to the plurality of power sources. The pumping system includes a second pump motor and a third pump. The second pump motor is mechanically connected to the third pump to drive the third pump. The second fuel pump motor being electrically connected to the plurality of power sources. The pumping system includes a third pump motor electrically connected to the plurality of power sources. The third pump motor being mechanically connected with the second fuel pump and the third pump such that the third pump motor is configured to drive one or both of the second pump and the third pump.

A method for use with a gas turbine engine includes supplying electric power to a first pump motor from a first power source, supplying electric power to a second pump motor from a second power source, supplying electric power to a third pump motor from a third power source, and one of: driving a second pump with the third pump motor in response to at least one of the first pump motor and a first pump becoming inoperable to continuously provide a flow of fluid without interruption, and driving a third pump with one of the second pump motor and the third pump motor in response to the other of the second pump motor and the third pump motor becoming inoperable to continuously drive the second pump without interruption.

These and other features of the present disclosure will become more apparent from the following description of the illustrative embodiments.

BRIEF DESCRIPTION OF THE DRAWINGS

FIGS. 3 and 4 are block diagrams illustrating a bidirectional fuel and oil pumping system in accordance with the present disclosure and adapted for operation with a gas turbine engine, the bidirectional fuel and oil pumping system including a first fuel pump motor, a first fuel pump, an oil pump motor, an oil pump, a bidirectional pump motor, a second fuel pump, and overrunning clutches, each of the first fuel pump motor, the first oil pump motor, the bidirectional pump motor being electrically connected to a plurality of power sources such that the bidirectional pump motor is configured to drive the second fuel pump in response to at least one of the first fuel pump motor and the first fuel pump becoming inoperable, and the bidirectional pump motor being configured to drive the oil pump in response to the oil pump motor becoming inoperable.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1A:
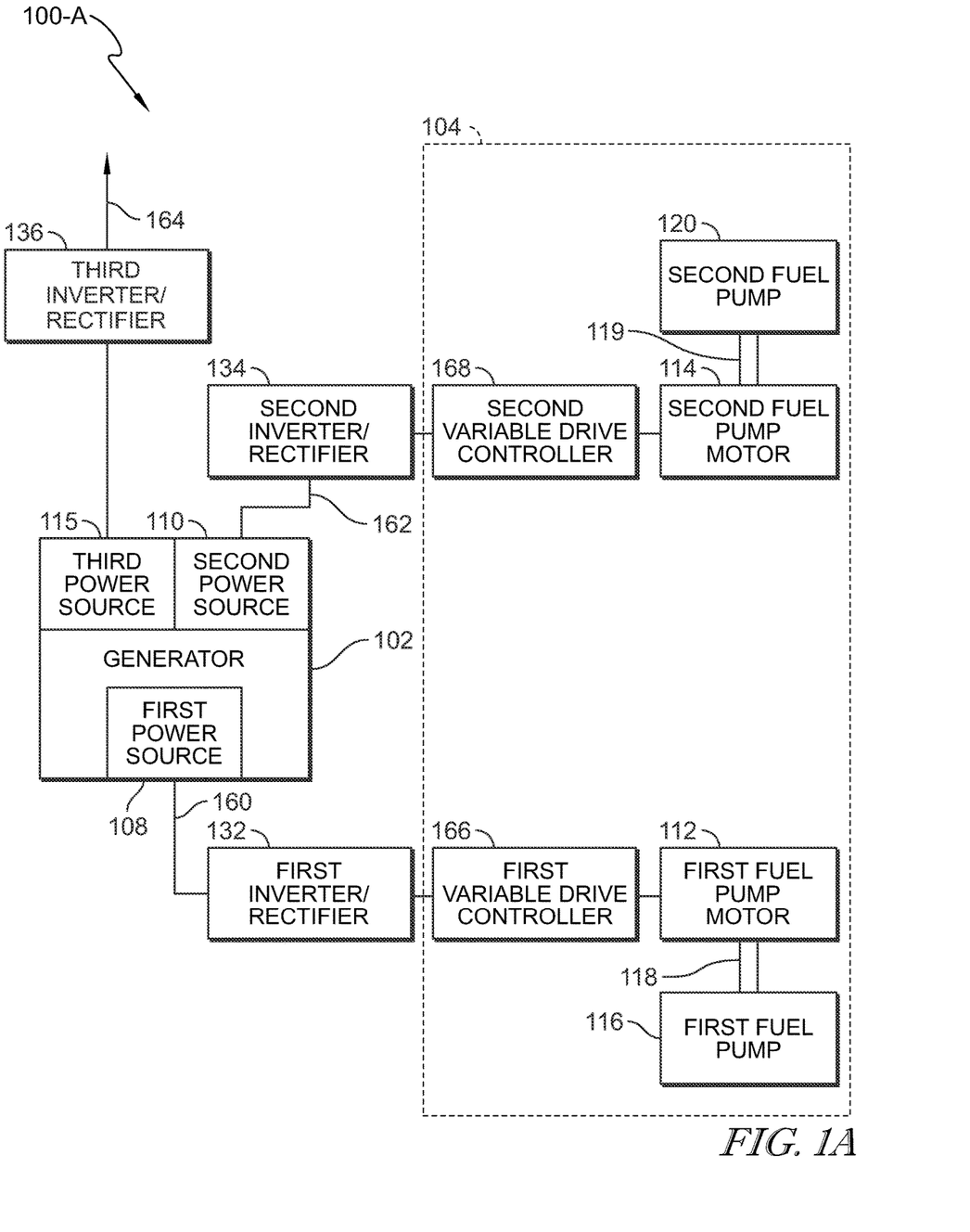
FIG. 1A is a block diagram illustrating a pumping system in accordance with the present disclosure and adapted for use in a gas turbine engine, the pumping system including a motor generator, and a fuel system configured for redundant powered operation.
Figure 1B:
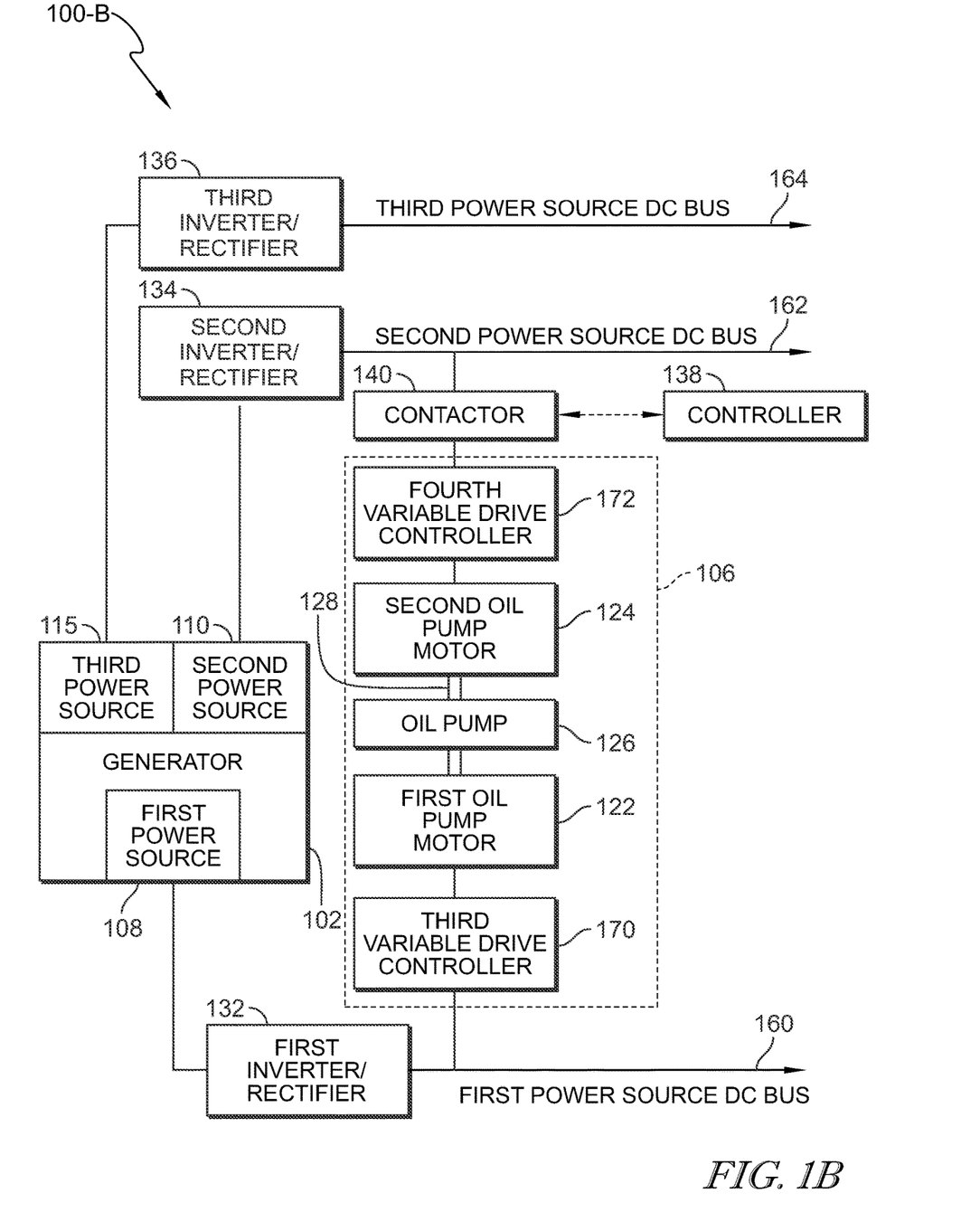
FIG. 1B is a block diagram illustrating a pumping system in accordance with the present disclosure and adapted for use in a gas turbine engine, the pumping system including a motor generator, and an oil system configured for redundant powered operation.

FIGS. 1A and 1B illustrate a pumping system 100-A and a pumping system 100-B, respectively, for use with a gas turbine engine. The pumping system 100-A is configured for redundant powered operation and includes a motor generator 102 and a fuel system 104. The motor generator 102 includes a plurality of power sources 108, 110, 115.

Alternating current (AC) power output by each of the plurality of power sources 108, 110, 115 of the generator or electric machine 102 is converted to direct current (DC) power, e.g., rectified, by a corresponding one of a first inverter-rectifier 132, a second inverter-rectifier 134, and a third inverter-rectifier 136. Output of the first inverter-rectifier 132 may be electrically connected to a first power source DC bus 160. Output of the second inverter-rectifier 134 may be electrically connected to a second power source DC bus 162. Output of the third inverter-rectifier 136 may be electrically connected to a third power source DC bus 164. Additionally, the DC buses 160, 162 and 164 can also be powered by an alternate source of DC power for example a battery on the aircraft.

Additionally or alternatively, the first inverter-rectifier 132, the second inverter-rectifier 134, and the third inverter-rectifier 136 may invert input DC power transferred, e.g., from a battery or another energy storage device, via a corresponding one of the first power source DC bus 160, the second power source DC bus 162, and the third power source DC bus 164 to AC power for use by the electric machine 102 via a respective one of the plurality of power sources 108, 110, 115 when the electric machine 102 is operating as a motor and providing drive torque to the engine for example during starting of the gas turbine engine.

The fuel system 104 includes a first fuel pump motor 112, a second fuel pump motor 114, a first fuel pump 116, a second fuel pump 120, a first fuel pump shaft 118, and a second fuel pump shaft 119. The first fuel pump motor 112 is mechanically connected to drive the first fuel pump 116 via the first fuel pump shaft 118. The second fuel pump motor 114 is mechanically connected to drive the second fuel pump 120 via the second fuel pump shaft 119. Each of the first fuel pump motor 112 and the second fuel pump motor 114 are electrically connected to and powered by the plurality of power sources 108, 110 of the generator 102.

Each of the first fuel pump motor 112 and the second fuel pump motor 114 may be a surface or an internal permanent magnet motor configured to operate according to and synchronously with the input drive frequency.

In one example, the first fuel pump motor 112 is driven by a first variable drive controller 166 and the second fuel pump motor 120 is driven by a second variable drive controller 168. The first variable drive controller 166 is powered by the first power source DC bus 160 and the second variable drive controller 168 is powered by the second power source DC bus 162.

Each of the first fuel pump 116 and the second fuel pump 120 is a positive displacement pump configured such that fuel flow within the fuel system 104 is proportional to the speed of the first fuel pump 116 and the second fuel pump 120, respectively. Examples of the first fuel pump 116 and the second fuel pump 120 include, but are not limited to, a gear pump, a generated rotor pump (or gerotor pump), and a vane pump.

A pumping system 100-B for use with a gas turbine engine is shown in FIG. 1B. The pumping system 100-B is configured for redundant powered operation and includes a motor generator 102 and an oil system 106. The motor generator 102 includes a plurality of power sources 108, 110, 115.

The oil system 106 is configured for redundant powered operation and includes a first oil pump motor 122, a second oil pump motor 124, an oil pump 126, and an oil pump shaft 128. The first oil pump motor 122 and the second oil pump motor 124 are mechanically connected in series with the oil pump 126 via the oil pump shaft 128. Each of the first oil pump motor 122 and the second oil pump motor 124 is electrically connected to and powered by the plurality of power sources 108, 110, 115. The first oil pump motor 122 is driven by a third variable drive controller 170 that is powered by the first power source 108. The second oil pump motor 124 is driven by a fourth variable drive controller 172 that is powered by the second power source 110.

The oil pump 126 is configured to be driven by both or a single one of the first oil pump motor 122 and the second oil pump motor 126. The oil pump 126 is a positive displacement pump configured such that oil flow within the oil system is proportional to the speed of the oil pump 126. Examples of the oil pump 126 include, but are not limited to, a gear pump, a generated rotor or gerotor pump, and a vane pump.

The first power source 108 of the motor generator 102 may comprise a first power source configured to supply power to the first fuel pump motor 112 and the first oil pump motor 122. The first power source 108 may supply power to one or more other components of an aircraft, such as, but not limited to, an engine (not shown). The second power source 110 of the motor generator 102 may comprise a second power source and may be electrically connected to supply power to the second fuel pump motor 114 and the second oil pump motor 124. The third power source 115 may provide power to multiple electrical buses. For example, the third power source 115 may be electrically connected via connection 164 to power one or more aircraft systems, subsystems, and/or components. Other implementations, such as implementations including different power sources and/or a different number of power sources are also contemplated.

In one example, the first inverter-rectifier 132 converts AC power generated by the generator 102 to DC power for use by the first variable drive controller 166, the third variable drive controller 170, the first fuel pump motor 112, the first oil pump motor 122, and other components powered by the first power source 108. As another example, the second inverter-rectifier 134 converts AC power generated by the generator 102 to DC power for use by the second variable drive controller 168, the fourth variable drive controller 172, the second fuel pump motor 114, the second oil pump motor 124, and other components powered by the second power source 110.

In one embodiment of the system a controller 138 monitors and controls operation of the fuel system 104 and the oil system 106, such as by monitoring and controlling operation of one or more other controllers, control modules, or other components that perform logic and/or processing operations to control operation of subcomponents of the fuel system 104 and the oil system 106. As described in reference to at least FIGS. 2A-2B, the controller 138 is communicatively connected to the first variable drive controller 166 and the second variable drive controller 168 that are, in turn, connected to the first fuel pump motor 112, the second fuel pump motor 114, the first fuel pump 116, and the second fuel pump 120 to monitor and control operation of the first fuel pump motor 112, the second fuel pump motor 114, the first fuel pump 116, and the second fuel pump 120. The controller 138 is communicatively connected to the third variable drive controller 170 and the fourth variable drive controller 172 that are, in turn, connected to the first oil pump motor 122, the second oil pump motor 124, and the oil pump 126 to monitor and control operation of the first oil pump motor 122, the second oil pump motor 124, and the oil pump 126. The controller 138 needs to be partitioned to provide two separate and isolated controls for each of the two fuel pumps and each of the two oil pumps using different power sources to provide redundancy to the fuel and oil pump functions.

A high-power switch or contact breaker, such as a contactor 140, is electrically connected between the second power source 110 and both the second fuel pump motor 114 and the second oil pump motor 124. The controller 138 operates to open and close the contactor 140 based on one or more operating conditions of the system 100. In an example, the controller 138 sends a signal or issues a command to open the contactor 140 to electrically disconnect the second fuel pump motor 114 and the second oil pump motor 124 from the second power source 110. One purpose to disconnect the second power source 110 with the contactor is when there is a short circuit in pump motors 114 or 124 or the respective drive controllers 168 and 172 to avoid the second power source being shorted which would otherwise result in failure of that power source. In some instances, one or more of the first variable drive controller 166, the second variable drive controller 168, the third variable drive controller 170, and the fourth variable drive controller 172 may be embodied as being a part of controller 138, where each variable drive controller is independent and isolated from the other variable drive controllers.

Figures 2A, 2B:
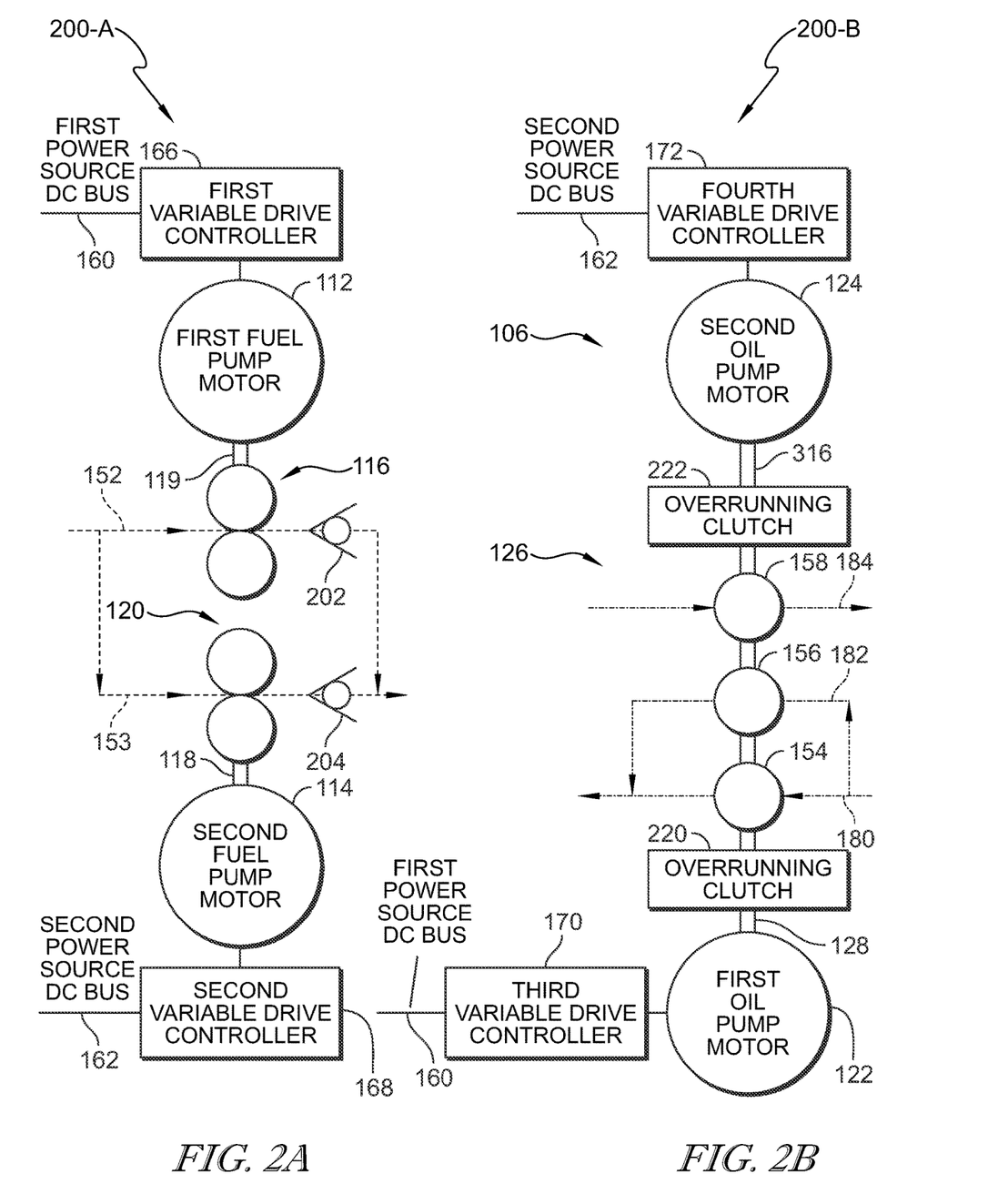
FIG. 2A is a block diagram illustrating the fuel system included in the pumping system of FIG. 1A, the fuel system including a first fuel pump motor, a second fuel pump motor, a first fuel pump, and a second fuel pump, the first fuel pump motor being mechanically connected to drive the first fuel pump, the second pump motor being mechanically connected to drive the second fuel pump, and the first fuel pump motor and the second fuel pump motor being electrically connected to a plurality of power sources to provide uninterrupted flow of fluid to the gas turbine engine.
FIG. 2B is a block diagram illustrating the oil system included in the pumping system of FIG. 1B, the oil system including a first oil pump motor, a second oil pump motor, an oil pump, and overrunning clutches, the first oil pump motor and the second oil pump motor being mechanically connected in series with the oil pump, and each of the first oil pump motor and the second oil pump motor being electrically connected to a plurality of power sources such that the oil pump is configured to be driven by both or a single one of the first oil pump motor and the second oil pump motor.

FIGS. 2A and 2B illustrate a pumping system 200-A and a pumping system 200-B, respectively, for use with a gas turbine engine. The pumping system 200-A includes the fuel system 104 configured for redundant powered operation and the pumping system 200-B includes the oil system 106 configured for redundant powered operation.

As shown in FIG. 2A, the first fuel pump 116 is connected to and configured to be driven by the first pump motor 112 and the second fuel pump 120 is connected to be driven by the second fuel pump motor 114. The variable drive controllers 166 and 168 control the fuel flow by controlling the speed of the first fuel pump 116 and the second fuel pump 120. In an example, the first variable drive controller 166 and the second variable drive controller 168 supply electric power to a corresponding one of the first fuel pump motor 112 and the second fuel pump motor 114 to drive one of the first fuel pump 116 and the second fuel pump 120 to achieve the required pump speed. The first fuel pump 116 is fluidly connected to a fuel supply line 152 and the second fuel pump 120 is fluidly connected to a fuel supply line 153.

Check valves 202 and 204 may be used on the output fuel pumps 116 and 120 to prevent backflow through an inoperative pump.

The first variable drive controller 166 and the second variable drive controller 168 control the first fuel pump motor 112 and the second fuel pump motor 114 to cause one of the first fuel pump 116 and the second fuel pump 120 to achieve the required combined operating speed corresponding to the fuel flow to the engine. The first variable drive controller 166 may be commanded or programmed to control electric power supplied to the first fuel pump motor 112 when one of the second fuel pump 120 becomes inoperable. The second variable drive controller 168 may be commanded or programmed to control electric power supplied to the second fuel pump motor 114 when the first fuel pump 116 becomes inoperable.

In normal, none failure operation, the total fuel flow is equal to the sum of the two fuel pump flows. For identically sized pumps this is proportional to the sum of the two pump speeds and the proportion of the fuel flow for the two pumps is based on the speed ratio of the two identical pumps. Since the pressure across the two pumps is equal the power ratio and torque ratio of the two identical pumps is based on the speed ratio of the two pumps. So the power ratio for the two pump motors is equal to the pump speed ratio and also pump flow ratios. So the variable drive controllers can set the motor power ratio by controlling the motor speed ratio.

In one example, the first variable drive controller 166 and the second variable drive controller 168 are programmed to vary the electric power supplied to the first fuel pump motor 112 and the second fuel pump motor 114 to divide the power demand of the fuel pump 116 between the first fuel pump motor 112 and the second fuel pump motor 114. The power distribution may split 100 percent power in any amount between the two pump motors 112, 114. For example, the power may be distributed 50/50, 40/60, 30/70, 25/75, 20/80, 10/90, 5/95, 0/100 between the two pump motors 112, 114. The first variable drive controller 166 and the second variable drive controller 168 may control the power split by controlling the proportion of torque output by each of the first fuel pump motor 112 and the second fuel pump motor 114. For example, to achieve a predefined desired speed of the fuel pump 116, the first variable drive controller 166 and the second variable drive controller 168 may operate the first fuel pump motor 112 and the second fuel pump motor 114 to produce output speed values that are equal for a 50/50 power split or may operate the first fuel pump motor 112 at twice the speed of the second fuel pump motor 114 for a 66/33 power split.

The first fuel pump motor 112 and the second fuel pump motor 114 are both configured to operate in a speed control mode where the sum of the speeds of the two motors is proportional to the fuel flow assuming identical fuel pumps.

In the speed control mode, each of the first variable drive controller 166 and the second variable drive controller 168 controls frequency input to the first fuel pump motor 112 and the second fuel pump motor 114 to achieve the required speed of the first fuel pump motor 112 and the second fuel pump motor 114.

In response to one of the first fuel pump motor 112 and the second fuel pump motor 114 becoming inoperable, the variable drive controllers 166 and 168 increase the speed of the other one of the first fuel pump motor 112 and the second fuel pump motor 114 in operation. For example, in response to the first fuel pump motor 112 becoming inoperable, the variable drive controllers 166 and 168 are programmed to increase the speed of the second fuel pump motor 114 in operation. As another example, the variable drive controllers 166 and 168 are programmed to, in response to the second fuel pump motor 114 becoming inoperable, increase the speed of the first fuel pump motor 112 in operation.

Since the total fuel flow is the sum of the fuel flow from both fuel pumps 116, 120, each fuel pump 116, 120 provides up to one-half of the total fuel flow at all times. The resulting fuel flow, in response to a given variable controller drive or motor becoming inoperative, is no lower than the lowest fuel flow from either of the two pumps at the time of failure. So engine flameout due to failure of a fuel pump, fuel motor or controller drive can be prevented if each pump is providing at least the minimum fuel flow to prevent engine flameout at all times, which is typically below 50% of the instantaneous fuel flow at all operating conditions.

The variable speed controller can respond very rapidly to increase motor speed and hence pump flow after failure of the other drive, motor or pump. This will allow the fuel flow to recovery rapidly after failure of one of the other fuel pump system and therefore limit the loss of engine thrust.

Further the rate of any speed increase of the motors can be limited to avoid fuel flow increases that could stall the gas turbine compressor based on pre-programmed fuel flow rate limits. This will ensure that in any fuel transient following a pump motor failure will not surge the gas turbine.

With reference to FIG. 2B, each of the first oil pump motor 122 and the second oil pump motor 124 is electrically connected such that the oil pump 126 is configured to be driven by both or a single one of the first oil pump motor 122 and the second oil pump motor 124. To meet a predefined oil flow demand that may correspond to a predefined speed of the oil pump 126, one or both of the third variable drive controller 170 and the fourth variable drive controller 172 supply a predefined amount of electric power to a corresponding one of the first oil pump motor 122 and the second oil pump motor 124 to drive the oil pump 126 to achieve the required pump speed.

The oil pump 126 illustratively includes a plurality of pumping elements as suggested in FIG. 2B. The oil pump 126 includes a first pumping element 154 fluidly connected to a first oil scavenge line 180 and a second pumping element 156 fluidly connected to a second oil scavenge line 182. The oil pump 126 further includes a third pumping element 158 fluidly connected to a lubrication supply line 184 of the gas turbine engine.

The third variable drive controller 170 and the fourth variable drive controller 172 may be commanded or programmed to vary electric power supplied to the first oil pump motor 122 and to the second oil pump motor 124 based on a power demand of the oil pump 126 to maintain a predefined target pump speed. In one example, the third variable drive controller 170 and the fourth variable drive controller 172 may be programmed to control the electric power supplied to the first oil pump motor 122 and the second oil pump motor 124 and divide and optimize the power demand of the oil pump 126 between the first oil pump motor 122 and the second oil pump motor 124. The power distribution may split 100 percent power in any amount between the two pump motors 122, 124. For example, the power may be distributed 50/50, 40/60, 30/70, 25/75, 20/80, 10/90, 5/95, 0/100 between the two pump motors 122, 124. The split of power for each of the pump motors can be controlled by controlling the ratio of torques output by the pump motors, for example, equal output torque values providing a 50/50 power split.

In some instances, each of the first oil pump motor 122 and the second oil pump motor 124 is configured to operate in a speed control mode with a speed scheduled torque or droop limit to control the ratio of power to each motor at the operating speed. In another example, the controller 118 is programmed to operate one of the first oil pump motor 122 and the second oil pump motor 124 in the speed control mode and another one of the first oil pump motor 122 and the second oil pump motor 124 in the torque control mode.

In response to one of the first oil pump motor 122 and the second oil pump motor 124 becoming inoperable, the variable speed drive controllers 170 and 172 increase supply of electric power to the other one of the first oil pump motor 122 and the second oil pump motor 124 in operation. For example, in response to the first oil pump motor 122 becoming inoperable, the variable speed drives 170 and 172 are programmed to increase supply of electric power to the second oil pump motor 124 in operation. As another example, the variable speed drives 170 and 172 are programmed to, in response to the second oil pump motor 124 becoming inoperable, increase supply of electric power to the first oil pump motor 122 in operation.

The variable speed drives 170 and 172 are configured to increase the supply of electric power to the other operable pump motor 122, 124 up to 100 percent power of that pump motor 122, 124 so that the operable pump motor 122, 124 is supplying 100 percent of the power to operate the pump 126. The variable speed drives 170 and 172 may detect that one of the pump motors 122, 124 is inoperable based on one or more of a voltage and/or amperage demand of the pump motors 122, 124, a rotational speed or torque reading of the pump motors 122, 124, or any other suitable measurement that indicates one or both pump motors 122, 124 have degraded or are fully inoperable.

The oil system 106 is configured for redundant powered operation using overrunning clutches 222, 224. Each of the first oil pump motor 122 and the second oil pump motor 124 of the oil system 106 is mechanically coupled to the oil pump 126 via the overrunning clutches 222, 224, respectively. A first overrunning clutch 220 is coupled with the first oil pump motor 122 and a second overrunning clutch 222 is coupled with the second oil pump motor 124. The first overrunning clutch 220 is configured to decouple the first oil pump motor 122 from the oil pump shaft 128 in response to the first oil pump motor 122 becoming inoperable. The second overrunning clutch 222 is configured to decouple the second oil pump motor 124 from the oil pump shaft 128 in response to the second oil pump motor 124 becoming inoperable. Implementing an overrunning clutch coupling prevents, or minimizes effects of, a back-drive and/or braking effect of the first oil pump motor 122 when the first oil pump motor 122 becomes inoperable and a back-drive and/or braking effect of the second oil pump motor 124 when the second oil pump motor 124 becomes inoperable. Put another way, the first oil pump motor 122 and the second oil pump motor 124 that becomes inoperable does not add drag to the first oil pump motor 122 and the second oil pump motor 124 still in operation, which, in turn, enables implementation of oil pump motors 122, 124 having smaller size and/or smaller input power needs than may be necessary to support redundant oil pump motors 122, 124 not coupled using the overrunning clutch.

Figure 3:
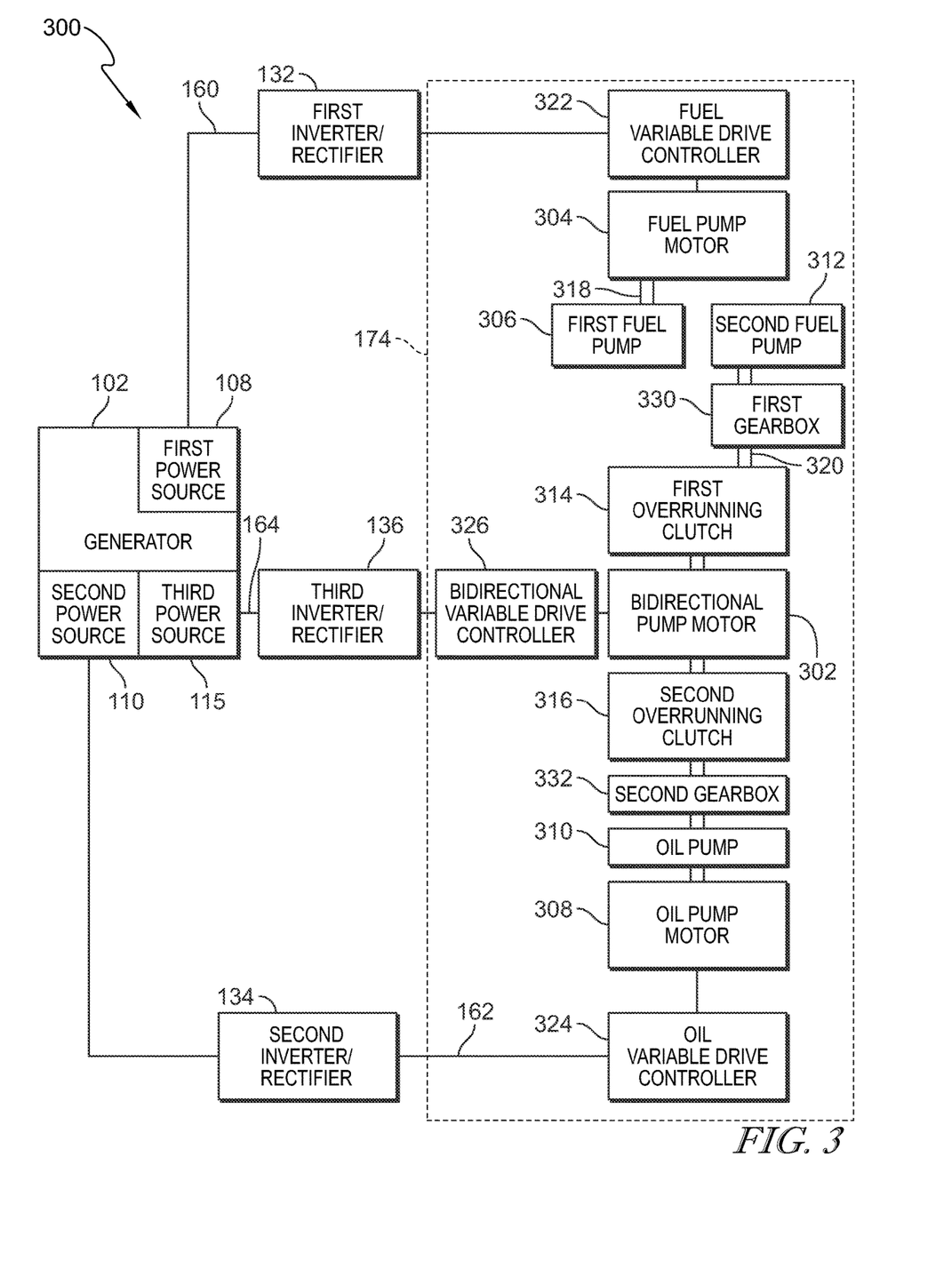
Figure 4:
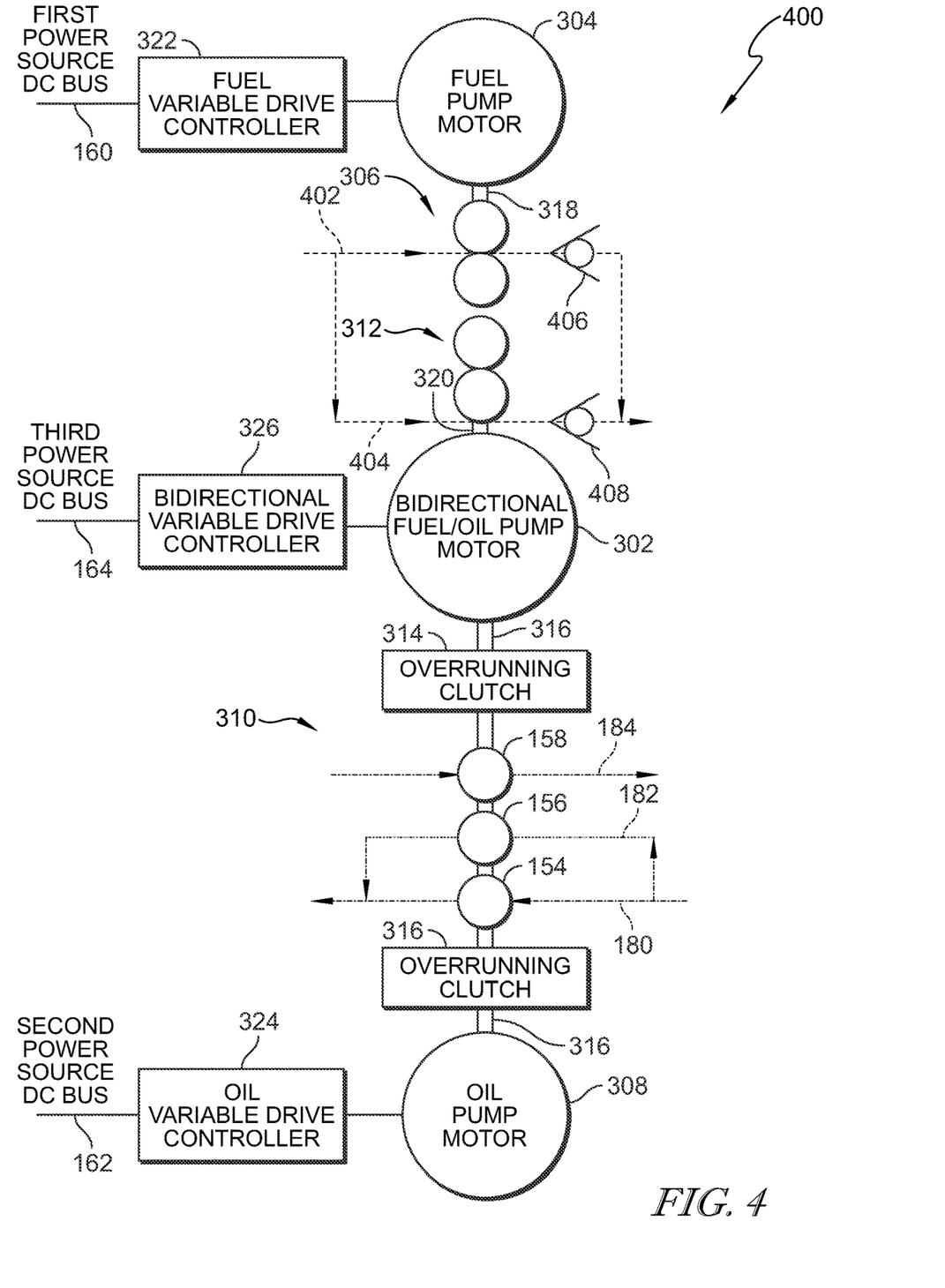

FIGS. 3 and 4 illustrate a bidirectional pumping system 300 and a bidirectional pumping system 400, respectively, for use with a gas turbine engine and configured for redundant powered operation.

The bidirectional fuel and oil system 300 includes a fuel pump motor 304, a first fuel pump 306, an oil pump motor 308, an oil pump 310, a bidirectional pump motor 302, a second fuel pump 312, overrunning clutches 314, 316, and pump shafts 318, 320. Each of the bidirectional pump motor 302, the fuel pump motor 304, and the oil pump motor 308 are electrically connected to a plurality of power sources 108, 110, 115 such that the bidirectional pump motor 302 is configured to drive the second fuel pump 312 in normal operation and also in response to at least one of the fuel pump motor 304 and the first fuel pump 306 becoming inoperable, and the bidirectional pump motor 302 is configured to drive the oil pump 310 in response to the oil pump motor 308 becoming inoperable. Check valves 406 and 408 are placed on the output of the fuel pumps 306 and 312 to prevent reverse flow through the check valves in the event one pump is inoperative.

As shown in FIGS. 3 and 4, the first fuel pump 306 is mechanically connected to be driven by the fuel pump motor 304 via a first pump shaft 318 and the second fuel pump 312 is mechanically connected to be driven by the bidirectional pump motor 302 via a second pump shaft 320. As shown in FIG. 4, the fuel pump 306 is fluidly connected to a first fuel supply line 402 and the second fuel pump 312 is fluidly connected to a second fuel supply line 404.

Variable drive controllers 322, 324, and 326 control the fuel/oil flow by controlling the speed of the fuel pump motor 304, the oil pump motor 308, and the bidirectional pump motor 302, respectively. In an example, the variable drive controllers 322, 324, and 326 supply electric power to a corresponding one of the fuel pump motor 304, the oil pump motor 308, and the bidirectional pump motor 302 to drive a corresponding one of the first fuel pump 306, the oil pump 310, and the second fuel pump 312 to achieve the required pump speed and hence desired engine fuel and oil flow.

In normal operation the bidirectional drive controller 326 is controlling the speed and hence fuel flow of the second fuel pump 312 through the first overrunning clutch 314, the second overrunning clutch 316 being disengaged due to the rotational direction of the bidirectional pump motor 302. The fuel variable drive controller 322 may be commanded or programmed to increase the speed of the fuel pump motor 304 to provide all the fuel flow when at least one of the bidirectional pump motor 302 and the second fuel pump 312 becomes inoperable. The bidirectional variable drive controller 326 may be commanded or programmed to increase the speed of the bidirectional pump motor 302 to provide all the fuel flow when at least one of the fuel pump motor 304 and the first fuel pump 306 becomes inoperable In both cases fuel flow will only be temporarily reduced for the pump system that fails and that loss of fuel flow will rapidly be recovered as the remaining pump system accelerates to the speed required for the total fuel flow.

In one example, the fuel variable drive controller 322 and the bidirectional variable drive controller 326 are programmed to vary the electric power supplied to the fuel pump motor 304 and to the bidirectional pump motor 302, respectively. The fuel variable drive controller 322 and the bidirectional variable drive controller 326 may divide the power demand of the fuel pump 316 and fuel pump 312 between the fuel pump motor 304 and to the bidirectional pump motor 302. The power distribution may split 100 percent power in any amount between the two pump motors 302 and 304. For example, the power may be distributed 50/50, 40/60, 30/70, 25/75, 20/80, 10/90, 5/95, 0/100 between the two pump motors 302 and 304.

The fuel pump motor 304, the oil pump motor 308 and the bidirectional pump motor 302 may be configured to operate in a speed control mode.

In response to the oil pump motor 308 becoming inoperable, the variable drive controller 326 slows down the bidirectional pump motor 302 driving the second fuel pump 312 through the first overrunning clutch 314 while the fuel pump motor 304 is increased at the same rate to maintain the total fuel flow. The bidirectional motor then reverses speed direction and ceases to drive the second fuel pump motor through the first overrunning clutch 314. In the reverse speed direction the bidirectional pump motor will drive the oil pump 310 through the second overrunning clutch 316 to the correct speed to deliver the engine oil flow.

To optimize the speeds of the bidirectional pump motors and fuel and oil pumps, first and second gearboxes 330, 332 may be mechanically coupled between the bidirectional pump motor 302 and the second fuel pump 312 and/or between the bidirectional pump motor 302 and the oil pump 310, respectively.

Figure 5:
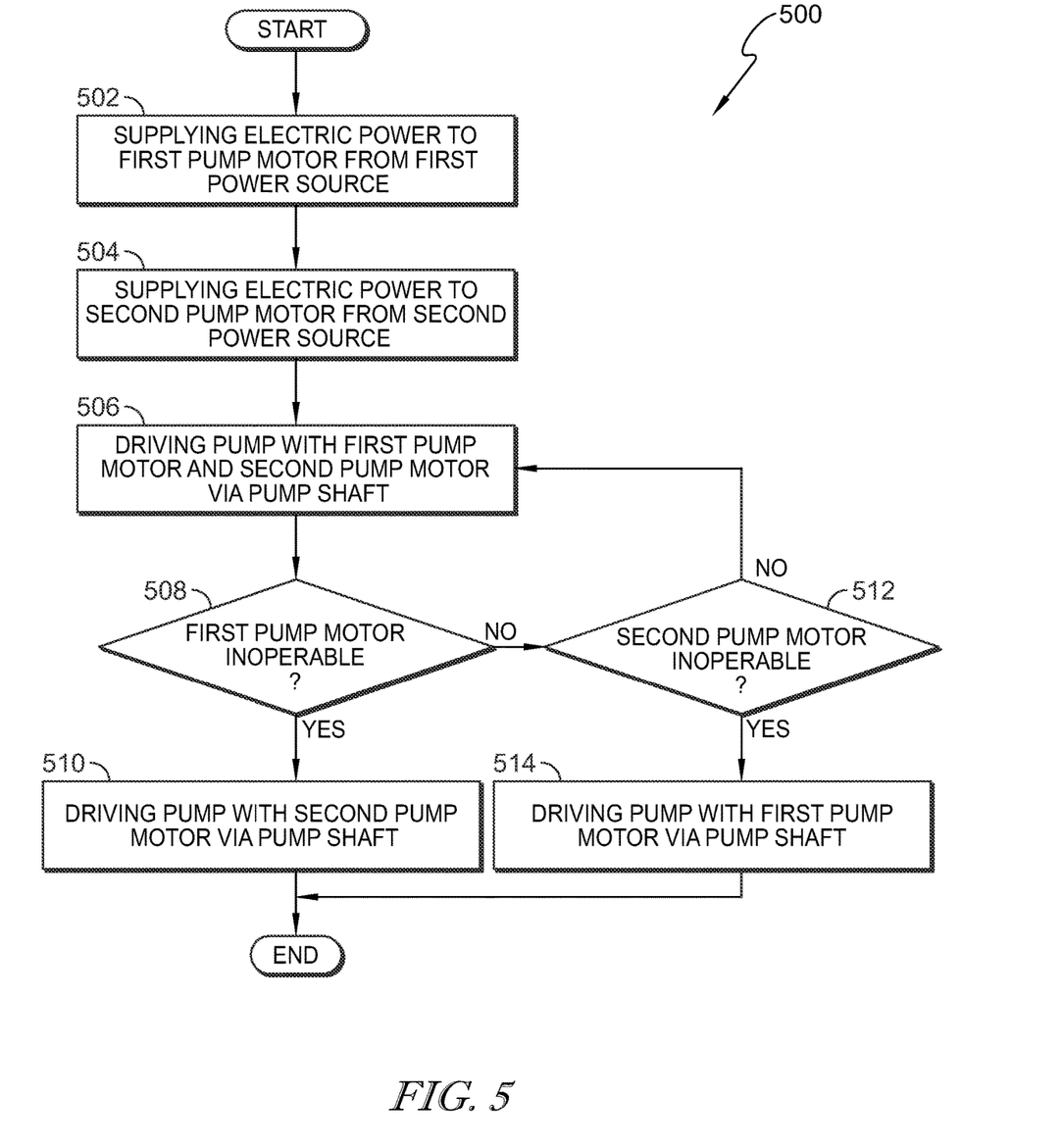
FIG. 5 is a process including supplying electric power to a first pump motor from a first power source, supplying electric power to a second pump motor from a second power source electrically independent from the first power source, driving a pump with the first pump motor and the second pump motor via a pump shaft, and driving the pump with only one of the first pump motor and the second pump motor in response to the other of the first pump motor and the second pump motor becoming inoperable to continuously drive the pump without interruption.

FIG. 5 illustrates an example process 500 for providing redundant power in a system with a gas turbine engine. In an example, one or more operations of the process 500 may be performed by the controller 138 that includes multiple independent and isolated variable drive controllers or by one or more other individual controllers in accordance with the present disclosure. As described in reference to at least FIGS. 1A, 1B, 2A, 2B, 3, and 4, the controller 138 communicates with one or more variable drive controllers, such as, the first variable drive controller 166, the second variable drive controller 168, the third variable drive controller 170, and the fourth variable drive controller 172, that drive the pump with one of the first pump motor and the second pump motor, in response to the other of the first pump motor and the second pump motor becoming inoperable, to continuously drive the pump without interruption.

The process 500 begins at block 502, where the controller 138, e.g., via one or more variable drive controllers, supplies electric power to the first pump motor 112, 122 from the first power source 108 of the plurality of power sources 108, 110, 115. The controller 138, at block 504, supplies electric power, e.g., via one or more variable drive controllers, to the second pump motor 114, 124 from the second power source 110 of the plurality of power sources 108, 110, 115. At block 506, the controller 138, e.g., via one or more variable drive controllers, drives the pump 116, 126 with the first pump motor 112, 122 and the second pump motor 114, 124 via a pump shaft 118, 128.

The controller 138, at block 508, determines whether the first pump motor 112, 122 is inoperable. In response to the first pump motor 112, 122 being inoperable, the controller 138 drives, e.g., via one or more variable drive controllers, the pump 116, 126 with the second pump motor 114, 124, at block 510. In response to the first pump motor 112, 122 being operable, i.e., not inoperable, the controller 138 continues to block 512, wherein the controller 138 determines whether the second pump motor 114, 124 is inoperable.

In response to the second pump motor 114, 124 being operable, i.e., not inoperable, the controller 138 returns to block 506 where the controller 138 drives, e.g., via one or more variable drive controllers, the pump 116, 126 with the first pump motor 112, 124 and the second pump motor 114, 124. In response to the second pump motor 114, 124 being inoperable, the controller 138, at block 514, drives, e.g., via one or more variable drive controllers, the pump 116, 126 with the first pump motor 112, 122. The process 500 may then end for example in response to the gas turbine engine being shut down.

An example arrangement of redundant electrical drives includes two fuel pump motors or motor power supplies each powering one of two fuel pumps. For example, the arrangement may include a first fuel pump motor coupled to a first power source that is driven by a first power source, such as, but not limited to, a high power electrical starter generator. As another example, the arrangement may include a second fuel pump motor coupled to a second power source that is driven by a second power source, such as, but not limited to, a different generator or battery power source.

In one example, to avoid, or to minimize, fuel flow interruption, the first and second power sources coupled to the first and second redundant fuel pump motors may be active. The first and second fuel pump motor may be configured to operate in a speed control mode. Operating the fuel pump motors in speed control mode may support achieving an optimum power split between the fuel pump motors, such that a portion of power demand supplied by each of the first fuel pump motor and the second fuel pump motor may be adjusted according to respective power availability, capacity, and other parameters of the first fuel pump motor and the second fuel pump motor.

Such load sharing between the two fuel pump motors being powered by different power sources may increase efficiency of the aircraft propulsion system, as a whole, and/or one or more subsystems of the of the aircraft propulsion system by optimizing which power source is used at any given instance depending on the available power from each power source and the efficiency of the power sources at that operating condition.

Load sharing for the fuel motors can also optimize the power from each pump to minimizing the effects of, component over-temperature or health to avoid damage to any one component of the redundant system, An example arrangement of redundant electrical drives includes two oil pump motors or motor power sources on common oil pump shaft. For example, the arrangement may include a first oil pump motor coupled to a first power source that is driven by a first power source, such as, but not limited to, a high power electrical starter generator. As another example, the arrangement may include a second oil pump motor coupled to a second power source that is driven by a second power source, such as, but not limited to, an aircraft power source, a low power generator, and so on.

In one example, to avoid, or to minimize, oil flow interruption the first and second power sources coupled to the first and second redundant oil pump motors may be active. The first oil pump motor may be configured to operate in a speed control mode and the second oil pump motor may be configured to operate in a torque control mode. Operating the first oil pump motor in the speed control mode and the second oil pump motor in the torque control mode may support achieving an optimum power split between the oil pump motors, such that a portion of power demand supplied by each of the first oil pump motor and the second oil pump motor may be adjusted according to respective power availability, capacity, and other parameters of the first oil pump motor and the second oil pump motor.

Such load sharing between the two oil pump motors being coupled to different power sources that are, in turn, electrically connected to different power sources may increase efficiency of the aircraft propulsion system, as a whole, and/or one or more subsystems of the of the aircraft propulsion system by optimizing which aircraft power source is used at any given instance dependent on the available power for each power source or depending on the efficiency of the power sources at that condition.

Load sharing between the two oil pump motors may be used minimize the effects of, component over-temperature or component health to avoid damage of any one component of the redundant system. As just some examples, load sharing may be implemented using torque droop control, e.g., decreasing output frequency of a drive in response to output torque of that drive being greater than a predefined output torque threshold, or using speed and torque control.

An example redundant electrical drives arrangement includes a fuel system having two separately (electrically) driven pumping components. Each pumping components may be configured to provide a predefined minimum fuel flow during operation. Each one of the two pumping components may be configured to provide up to a predefined maximum fuel flow in response to the other fuel pump stopping operation, where the predefined maximum fuel flow corresponds to a maximum fuel flow demand of the system.

The redundant electrical drive arrangement of the present disclosure providing uninterrupted, or nearly uninterrupted, system operation by avoiding flameout and other conditions in response to sudden single drive failure and so on. The disclosed redundant electrical drive system is configured to prevent mechanical or electrical consumption by the failed component of the system, e.g., added drag, that may limit effectiveness of the motor still in operation.

Power or torque of each of the first pump motor and the second pump motor may be optimized to maximize efficiency without exceeding capability of each of the first pump motor and the second pump motor or the respective variable drive controllers. For example, each of the first pump motor and the second pump motor may be configured to operate such that a corresponding amount (or a portion, or a proportion) of power delivered by the first pump motor and the second pump motor is based on the temperature or health of the motors and the respective variable drive controllers. During a starting operation, one or both of the first pump motor and the second pump motor may generate a portion or all power used to initiate operation of the gas turbine.

The redundant electrical drive system of the present disclosure supports controlling the power demand for each of the power sources of the first oil pump motor and the second oil pump motor by controlling torque of the respective one of the first oil pump motor and the second oil pump motor. For example, power necessary to operate the oil pump is a product of an angular velocity of the shaft and a combination of a first torque of the first oil pump motor and a second torque of the second oil pump motor. In other words, values of the first torque and the second torque may be adjusted relative to one another to a total torque value necessary to operate the oil pump.

In some instances, the amount of power used to overcome drag generated by a pump motor that has become inoperable may constitute a large portion of pumping power used to maintain seamless system operation. Likewise, a size of the corresponding power source to each of the first and second pump motors may need to be able to accommodate additional power used to overcome the power drag when the pump motor supported by the other power source becomes inoperable. Thus, frequently, one or both pump motors, as well as, power sources providing energy to these pump motors in a redundant system may need to be configured to support such an additional power usage, thereby adding significant weight, cost and volume to the motors, drives and generator or battery power source. Also, if bearings fail in one motor or motor seizes due to an over-temperature condition, then failed motor torque could prevent pumping by remaining motor.

In the redundant system of the present disclosure, the first and second oil pump motors driving an oil pump may be connected with one another through an overrunning clutch. Implementing the overrunning clutch coupling may assist in preventing, or minimizing effects of, a back-drive and/or braking effect of the first oil pump motor and the second oil pump motor when the first oil pump motor and the second oil pump motor, respectively, become inoperable. Put another way, the first oil pump motor and the second oil pump motor that becomes inoperable does not add drag to the first oil pump motor and the second oil pump motor still in operation, which, in turn, enables implementation of oil pump motors, drives and generator or battery power sources having smaller size and/or smaller input power capabilities than may otherwise be necessary to support redundant oil pump motors not coupled using the overrunning clutch.

One embodiment of the pumping system of the present invention includes using induction motors as the oil pump motors where the exact volumetric oil flow is not critical to the operation of the engine. Induction motors have the advantage of inherent load sharing where two motors are driving the same pump due to the slip speed to torque relationship for an induction motor.

An example implementation of the pumping system of the present disclosures includes a motor generator having a plurality of power sources and a fuel system configured for redundant powered operation. The fuel system includes a first fuel pump motor, a second fuel pump motor, a fuel pump, and a fuel pump shaft. The first fuel pump motor and the second fuel pump motor are mechanically connected in series with the fuel pump via the fuel pump shaft, and each of the first fuel pump motor and the second fuel pump motor being electrically connected to the plurality of power sources such that the fuel pump is configured to be driven by both or a single one of the first fuel pump motor and the second fuel pump motor. The pumping system includes an oil system configured for redundant powered operation. The oil system including a first oil pump motor, a second oil pump motor, an oil pump, and an oil pump shaft. The first oil pump motor and the second oil pump motor are mechanically connected in series with the oil pump via the oil pump shaft, and each of the first oil pump motor and the second oil pump motor being electrically connected to the plurality of power sources such that the oil pump is configured to be driven by both or a single one of the first oil pump motor and the second oil pump motor.

One other embodiment of the pumping system of the present disclosure includes a controller programmed to control at least one of speed and torque of the first fuel pump motor and second fuel pump motor to drive the fuel pump at a predefined speed, wherein the predefined speed of the fuel pump is based on fuel flow requested by the engine.

Another embodiment of the pumping system of the present disclosure includes a controller programmed to control electric power supplied to the first fuel pump motor and the second fuel pump motor to optimize the power demand from the engine or aircraft power sources and provide a total power and torque output to cause the fuel pump to operate at the predefined speed.

Still another embodiment of the pumping system of the present disclosure includes the controller being programmed to increase electric power to the first fuel pump motor in response to the second fuel pump motor becoming inoperable.

Yet another embodiment of the pumping system of the present disclosure includes the controller being programmed to drive one of the first fuel pump motor and the second fuel pump motor based on a torque limit.

Another embodiment of the pumping system of the present disclosure includes a power split for each of the first fuel pump motor and the second fuel pump motor being optimized based on a maximum operating temperature of the first fuel pump motor, second fuel pump motor and the dedicated controllers.

Still another embodiment of the pumping system of the present disclosure includes a controller programmed to control speed or torque of the first oil pump motor and the second oil pump motor based on the oil flow requested by the engine.

Another embodiment of the pumping system of the present disclosure includes the controller being programmed to control the power or torque supplied to the first oil pump motor and the second oil pump motor according to the power available from the engine and aircraft power sources for the two motors.

Yet another embodiment of the pumping system of the present disclosure includes the controller being configured to increase electric power to the first oil pump motor in response to the second oil pump motor becoming inoperable.

Still another embodiment of the pumping system of the present disclosure includes the controller being programmed to drive one of the first oil pump motor and the second oil pump motor based on a torque limit.

As another example, the pumping system of the present disclosure includes an overrunning clutch coupled with the first pump motor and the second pump motor. The overrunning clutch is configured to permit the first pump motor to drive the pump without driving the second pump motor, in response to the second pump motor becoming inoperable.

In an example, a pumping system of the present disclosure includes a motor generator having a plurality of power sources, a first pump motor, a second pump motor, a pump, and a pump shaft. The first pump motor is electrically connected to the plurality of power sources, the second pump motor is electrically connected to the plurality of power sources, and the first pump motor and the second pump motor being coupled to the pump via the pump shaft to provide single or redundant supply of power to operate the pump.

As yet another example, the pumping system of the present disclosure provides redundant supply of power by providing uninterrupted operation of the pump in response to one of the first pump motor and the second pump motor stopping operation.

Another embodiment of the pumping system of the present disclosure is such that one of the first pump motor and the second pump motor operates in a speed control mode.

Still another embodiment of the pumping system of the present disclosure is such that one of the first pump motor and the second pump motor operates in a torque control mode.

One embodiment of the pumping system of the present disclosure is such that the first pump motor is a first fuel pump motor, the second pump motor is a second fuel pump motor, the pump is a fuel pump, and the pump shaft is a fuel pump shaft.

Another embodiment of the pumping system of the present disclosure is such that the first pump motor is a first oil pump motor, the second pump motor is a second oil pump motor, the pump is an oil pump, and the pump shaft is an oil pump shaft.

Still another embodiment of the pumping system of the present disclosure is such that each of the first pump motor and the second pump motor is electrically powered by a different one of the plurality of power sources.

Yet another embodiment of the pumping system of the present disclosure is such that the plurality of power sources include one of an engine generator winding and an aircraft power bus.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A pumping system for use with a gas turbine engine, the pumping system comprising:
    a plurality of power sources;
    a fuel system configured for redundant operation, the fuel system including a fuel pump motor, a first fuel pump, and a second fuel pump, the fuel pump motor being mechanically connected with the first fuel pump to drive the first fuel pump, and the fuel pump motor being electrically connected to at least one power source of the plurality of power sources;
    an oil system configured for redundant operation, the oil system including an oil pump motor, and an oil pump, the oil pump motor is mechanically connected with the oil pump to drive the oil pump, and the oil pump motor being electrically connected to at least one power source of the plurality of power sources; and
    a bidirectional pump motor electrically connected to at least one power source of the plurality of power sources, and the bidirectional pump motor is mechanically connected with the second fuel pump and the oil pump such that the bidirectional pump motor is configured to drive either the second fuel pump or the oil pump.

2. The pumping system of claim 1, wherein the fuel system further includes a first overrunning clutch mechanically connected between the second fuel pump and the bidirectional pump motor, and the oil system includes a second overrunning clutch mechanically connected between the oil pump and the bidirectional pump motor.

3. The pumping system of claim 1, wherein a gearbox is provided on an output of the bidirectional pump motor to drive at least one of the second fuel pump or the oil pump at a different speed than the bidirectional pump motor.

4. The pumping system of claim 1, wherein a third controller is configured to increase a speed and power to the bidirectional pump motor to drive the second fuel pump through a first overrunning clutch to provide all the engine fuel flow in response to the first fuel pump motor becoming inoperable.

5. The pumping system of claim 4, wherein the third controller is programmed to drive the bidirectional pump motor in an opposite direction to drive the oil pump through a second overrunning clutch to provide an oil flow to the gas turbine engine in response to the oil pump motor becoming inoperable.

6. The pumping system of claim 1, wherein the fuel pump motor, the oil pump motor, and the bidirectional pump motor are each powered by three independent and isolated windings from one generator.

7. The pumping system of claim 6, wherein the generator with the three independent and isolated windings is located on an inside of the gas turbine engine, and wherein the generator is driven by an engine shaft included in the gas turbine engine.

8. The pumping system of claim 1, wherein the pumping system further comprises a first controller configured to drive the fuel pump motor, a second controller configured to drive the oil pump motor, and a third controller configured to drive the bidirectional pump motor, and each of the first controller, the second controller, and the third controller drives the corresponding motor based on one of a torque limit and a speed limit.

9. The pumping system of claim 1, wherein the fuel system includes check valves disposed at outputs of the first and second fuel pumps to prevent reverse fuel flow through one of the first or second fuel pumps that has become inoperable.

10. The pumping system of claim 1, wherein a power split for each of the first fuel pump motor driving the first fuel pump and the bidirectional pump motor driving the second fuel pump is optimized based on a power availability and efficiency of power supplied from the plurality of power sources.

11. The pumping system of claim 1, wherein a power split for each of the first fuel pump motor and the bidirectional pump motor is controlled to optimize an operating temperature of at least one of the first fuel pump motor and the bidirectional pump motor.

12. A pumping system for use with a gas turbine engine, the pumping system comprising:
    a plurality of power sources;
    a first pump motor, a first pump, and a second pump, the first pump motor being mechanically connected with the first pump to drive the first pump, and the first pump motor being electrically connected to at least one power source of the plurality of power sources;
    a second pump motor and a third pump, the second pump motor is mechanically connected with the third pump to drive the third pump, and the second pump motor being electrically connected to at least one power source of the plurality of power sources; and
    a third pump motor electrically connected to at least one power source of the plurality of power sources, and the third pump motor being mechanically connected with the second pump and the third pump such that the third pump motor is configured to drive one or both of the second pump and the third pump.

13. The pumping system of claim 12, further comprising a first overrunning clutch mechanically connected between the second pump and the third pump motor, and a second overrunning clutch mechanically connected between the third pump and the third pump motor.

14. The pumping system of claim 12, wherein one of the first pump motor, the second pump motor, and the third pump motor operates in a speed control mode.

15. The pumping system of claim 14, wherein another one of the first pump motor, the second pump motor, and the third pump motor operates in a torque control mode.

16. The pumping system of claim 12, wherein the first pump motor is a fuel pump motor, the second pump motor is an oil pump motor, the first pump is a first fuel pump, the second pump is a second fuel pump, and the third pump is an oil pump.

17. The pumping system of claim 12, wherein the third pump motor is a bidirectional pump motor.

18. The pumping system of claim 12, wherein each of the first pump motor, the second pump motor, and the third pump motor is electrically coupled to a different one of the plurality of power sources.

19. The pumping system of claim 12, wherein each of the first pump motor, the second pump motor, and the third pump motor is electrically powered by independent generator windings on one generator rotor.

20. A method for use with a gas turbine engine, the method comprising:
   supplying electric power to a first pump motor from a first power source,
   supplying electric power to a second pump motor from a second power source,
   supplying electric power to a third pump motor from a third power source, and
   one of:
   driving a second pump with the third pump motor in response to at least one of the first pump motor and a first pump becoming inoperable to continuously provide a flow of fluid without interruption, and
   driving a third pump with one of the second pump motor and the third pump motor in response to the other of the second pump motor and the third pump motor becoming inoperable to continuously drive the second pump without interruption.

\* \* \* \* \*